US012437914B2

(12) United States Patent
Griebler et al.

(10) Patent No.: US 12,437,914 B2
(45) Date of Patent: Oct. 7, 2025

(54) COMPENSATION BLOCK FOR AIR-CORE REACTORS AND TRANSFORMERS

(71) Applicant: HSP HOCHSPANNUNGSGERÄTE GMBH, Troisdorf (DE)

(72) Inventors: Peter Griebler, Hargelsberg (AT); Klaus Pointner, Linz (AT); Helmut Reisinger, St. Georgen/Gusen (AT)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 659 days.

(21) Appl. No.: 17/762,818

(22) PCT Filed: Aug. 31, 2020

(86) PCT No.: PCT/EP2020/074201
§ 371 (c)(1),
(2) Date: Mar. 23, 2022

(87) PCT Pub. No.: WO2021/058229
PCT Pub. Date: Apr. 1, 2021

(65) Prior Publication Data
US 2022/0344094 A1 Oct. 27, 2022

(30) Foreign Application Priority Data
Sep. 23, 2019 (EP) .................................... 19198956

(51) Int. Cl.
*H01F 37/00* (2006.01)
*H01F 27/30* (2006.01)

(52) U.S. Cl.
CPC ......... *H01F 37/005* (2013.01); *H01F 27/306* (2013.01)

(58) Field of Classification Search
CPC ............................ H01F 37/005; H01F 27/306
USPC .......................................................... 336/185
See application file for complete search history.

(56) References Cited

U.S. PATENT DOCUMENTS 3,264,590 A * 8/1966 Trench .................. H01F 37/005 336/60
8,274,354 B2 9/2012 Zillmann et al.
8,520,357 B2 8/2013 Reisinger et al.
10,777,348 B2 * 9/2020 Haslehner ............. H01F 27/306
2016/0005529 A1 * 1/2016 Haslehner ............. H01F 27/006 336/208
2016/0043312 A1 2/2016 Yang et al.
2018/0033545 A1 2/2018 Schrammel

FOREIGN PATENT DOCUMENTS

CN 2227869 Y * 5/1996
CN 201054300 Y * 4/2008
CN 201608015 U * 10/2010
(Continued)

*Primary Examiner* — Shawki S Ismail
*Assistant Examiner* — Joselito S. Baisa
(74) *Attorney, Agent, or Firm* — Laurence A. Greenberg; Werner H. Stemer; Ralph E. Locher

(57) ABSTRACT

A compensation block for air-core inductors or transformers is formed as a sandwich structure. The sandwich structure of the compensation block includes an upper insulating material block, a lower insulating material block, and an elastomer block arranged between the upper and lower insulating material blocks. The novel compensation block allows the formation of gaps due to settlement to be reduced.

4 Claims, 2 Drawing Sheets

(56) References Cited

FOREIGN PATENT DOCUMENTS

| | | | | | |
|---|---|---|---|---|---|
| CN | 105684148 | A | | 6/2016 | |
| CN | 206277067 | U | * | 6/2017 | |
| CN | 211062567 | U | * | 7/2020 | |
| CN | 115410809 | A | * | 11/2022 | ........... H01F 27/085 |
| DE | 2934719 | A1 | | 3/1980 | |
| DE | 20105608 | U1 | | 11/2001 | |
| DE | 102008010548 | A1 | | 8/2009 | |
| DE | 102015208470 | A1 | | 11/2016 | |
| EP | 0084412 | A1 | | 7/1983 | |
| EP | 2973621 | B1 | | 3/2017 | |
| JP | H10326714 | A | | 12/1998 | |
| WO | 2009126977 | A1 | | 10/2009 | |
| WO | WO-2022086505 | A1 | * | 4/2022 | ........... H01F 27/303 |

* cited by examiner

COMPENSATION BLOCK FOR AIR-CORE REACTORS AND TRANSFORMERS

FIELD AND BACKGROUND OF THE INVENTION

Dry-insulated air-core reactors are used for example in electrical systems for energy transmission and in power supply systems of industrial plants in order to protect these systems or in order to enhance the performance thereof.

Since no insulating oils are used, they are environmentally friendly and an increased risk of fire does not exist. Furthermore, dry-insulated air-core reactors are largely maintenance-free.

As current limiting reactors, they serve to limit short circuit currents in regions of power grids that exhibit very high short circuit currents in the event of a fault on account of their low grid impedance, for example in substations in the region of busbars with multiple feeds.

The object of the series-connected current limiting reactors is to limit the short circuit power in power grids by way of the additionally introduced impedance such that circuit breakers can reliably interrupt the short circuit current in the event of a fault.

Furthermore, they are used as smoothing chokes for example in high-voltage direct current transmission systems.

A typical air-core reactor, as described in WO 2009/126977, has concentric winding layers, which are respectively held at their upper and lower axial ends by a spider made up of a plurality of arms, known as spider blades, arranged radially in a star shape.

Rather than a one-piece spider, it is also possible to use in each case a multiplicity of individual spider blades, which are located only in the region above and below the winding layers in order to save spider blade material. The mutually opposite spiders or spider blades are braced together with the aid of spacer strips or tension bands extending between the winding layers, in order to retain the winding layers.

When the reactor is wound, the spider blades and spacer strips are used at the same time as winding aids in that first of all the lower spider blades are clamped on a rotary device and then the winding layers are built up thereon, wherein a respective set of spacer strips is mounted in between.

EP 2 973 621 B1 discloses, in order to compensate for different overall heights of the individual winding layers on account of different conductor cross sections, providing winding-layer pitch compensation, in which, between the mutually axially opposite spider blades and the winding layer located in between, compensating blades are introduced, which support the winding layers with respect to the spider blades and center them in the axial direction.

After the production process and during operation of the air-core reactors, settling of the winding bodies, and thus gap formation, especially at the winding ends, occurs on account of thermal and mechanical operating loads.

These gaps have to be complicatedly made up for with suitable filling material, resulting in temporary shutdowns of the plant during operation.

SUMMARY OF THE INVENTION

Therefore, the invention is based on the object of improving the structure of air-core reactors such that gap formation as a result of settling can be reduced.

According to the invention, this takes place using a compensation block as claimed.

Advantageous refinements can be gathered from the dependent claims.

The invention is explained in more detail with reference to the figures.

In the figures, by way of example:

DETAILED DESCRIPTION OF THE INVENTION

Figure 1:
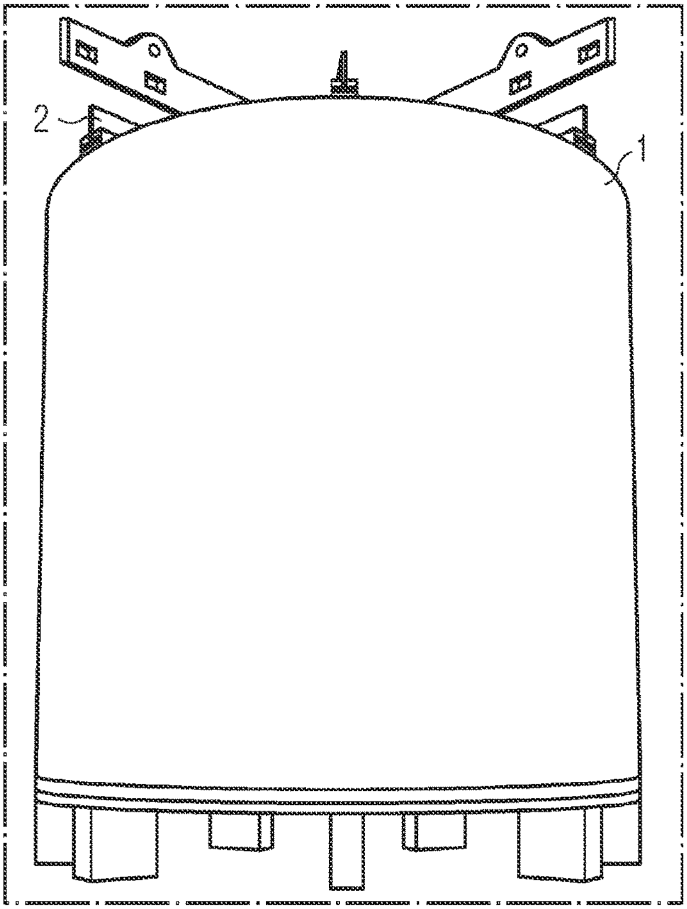
FIG. 1 shows a current limiting reactor with concentrically arranged windings, which have been reinforced by means of glass-fiber-reinforced epoxy resin.

The current limiting reactor according to FIG. 1 has concentrically arranged windings reinforced by means of glass-fiber-reinforced epoxy resin, of which only the outer winding layer is visible.

At the upper and lower ends, the windings are fixed by spiders, the arms of which extend in a radial direction from the reactor axis beyond the radius of the outer winding.

According to the invention, a compensation block is now introduced between a winding end and an upper spider arm of the air-core reactor.

Figure 2:
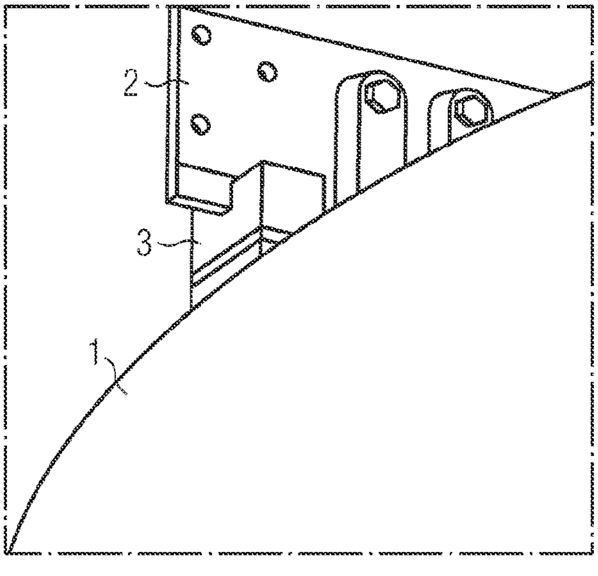
FIG. 2 shows a detail view of an upper winding end with a compensation block according to the invention.
Figure 3:
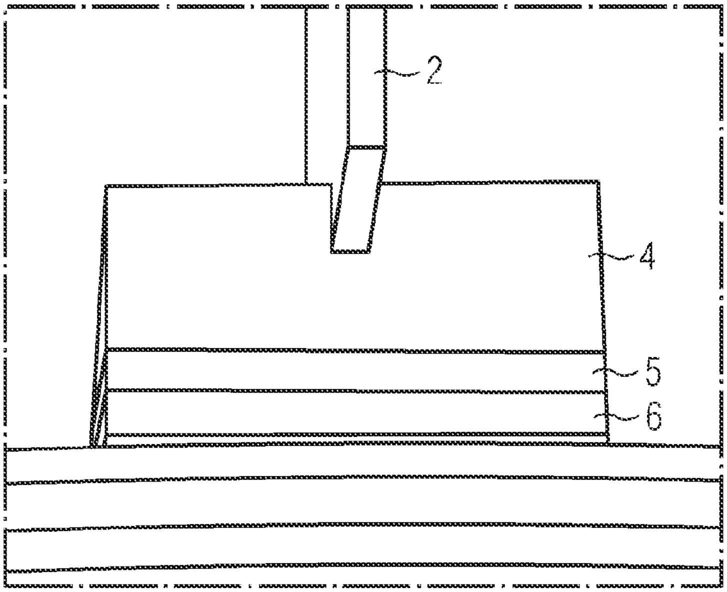
FIG. 3 shows an arm of a spider with a compensation block according to the invention.
Figure 4:
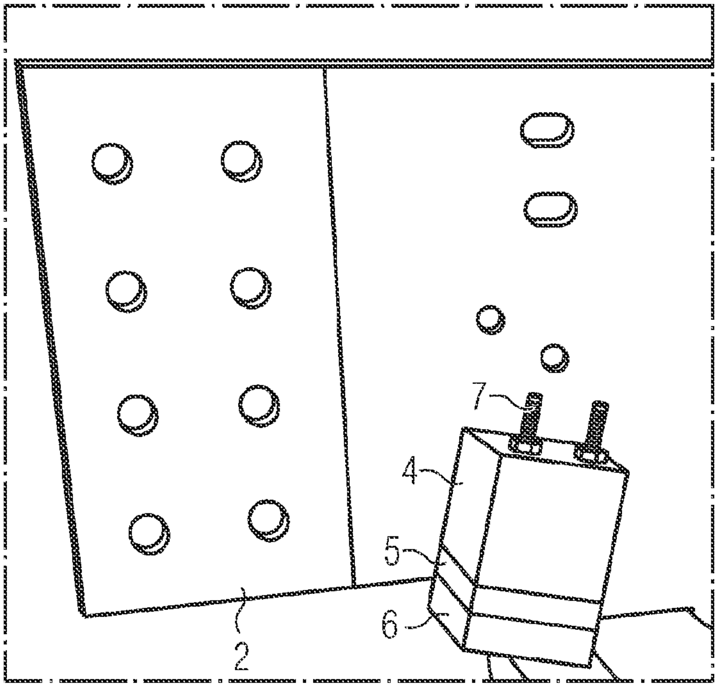
FIG. 4 shows an arm of a spider with a compensation block according to the invention during the assembly process.

As is apparent from FIGS. 2, 3 and 4, this compensation block has a sandwich structure with an upper insulating material block, a lower insulating material block and an elastomer block located therebetween.

It is advantageous here for the upper spider arms of the air-core reactor and the compensation blocks to be connected together in a form-fitting manner by means of a meshed connection.

To this end, the spider arms have a rectangular cutout, the width of which corresponds to the width of the compensation blocks, and the height of which corresponds to a part of the height of the upper insulating material block of the compensation blocks.

As counterpart, the compensation blocks have a slot for receiving the portion of the spider arms above the rectangular cutout.

As a result of this form-fitting connection, the compensation blocks are fixed in position and slipping is prevented.

The compensation blocks are mounted as follows:

- the compensation block is compressed by means of a clamping device;
- it is introduced into the intended position between a winding end and an upper spider arm of the air-core reactor, and the clamping device is released.

The clamping device may consist for example of threaded pins which project through the sandwich structure of the compensation block and compress the compensation blocks by means of screwing.

Alternatively, clamping devices based on clamps, riveted connections or snap locks are also conceivable.

The preferred use of the compensation blocks according to the invention is for air-core reactors, but it is also possible for windings of transformers.

LIST OF REFERENCE SIGNS

1 Outer winding layer
2 Arm of the upper spider

3 Compensation block
4 Upper insulating material block
5 Elastomer block
6 Lower insulating material block
7 Clamping device

The invention claimed is:

1. A compensation block for an air-core reactor or a transformer, the compensation block comprising:

a sandwich structure with an upper insulating material block, a lower insulating material block, and an elastomer block disposed between said upper and lower insulating material blocks;

the compensation block having a slot formed therein for connecting an upper spider arm of the air-core reactor and said compensation block together in a form-fit having a meshed connection;

said upper spider arm having a rectangular cutout formed therein, with said rectangular cutout having a width corresponding to a width of said compensation block and a height corresponding to a part of a height of said upper insulating material block of said compensation block, wherein said compensation block is arrangeable between a winding end and said upper spider arm of said air-core reactor, and wherein said slot is formed to receive the portion of said spider arm above said rectangular cutout.

2. An air-core reactor, comprising:

a winding with a winding end and an upper spider arm of the air-core reactor; and a compensation block according to claim 1 arranged between said winding end and said upper spider arm of the air-core reactor;

said upper spider arm of the air-core reactor and said compensation block being connected together in a form-fit having a meshed connection; and said upper spider arm having a rectangular cutout formed therein, said rectangular cutout having a width that corresponds to the width of said compensation block and a height that corresponds to a part of the height of said upper insulating material block of said compensation block, and wherein said compensation block has a slot forming a counterpart for receiving said portion of said spider arm above said rectangular cutout.

3. The air-core reactor according to claim 2, wherein said upper spider arm is one of a plurality of upper spider arms and said compensation block is one of a plurality of compensation blocks each form-fittingly connected with a respective one of said upper spider arms.

4. A method of mounting a compensation block in an air-core reactor, the method comprising:

providing the air-core reactor according to claim 2 with an upper spider arm and a winding;

providing the compensation block having a sandwich structure with an upper insulating material block, a lower insulating material block, and an elastomer block disposed therebetween;

compressing the compensation block by way of a clamping device;

introducing the compensation block into an intended position between a winding end and the upper spider arm of the air-core reactor to connect the upper spider arm of the air-core reactor and the compensation block together in a form-fit with a meshed connection between the upper spider arm and the compensation block; and releasing the clamping device.

* * * * *